Inventor
Thomas K. Powrie

UNITED STATES PATENT OFFICE 2,169,709

RING FOR SPINNING, DOUBLING, OR TWISTING FRAMES

Thomas Kilpatrick Powrie, Paisley, Scotland

Application January 10, 1938, Serial No. 184,296
In Great Britain January 21, 1937

4 Claims. (Cl. 57—120)

This invention relates to rings used in ring spinning, doubling, twisting or like frames and particularly to improvements in rings of the type which use travellers known in the trade as "ear-shaped" travellers.

During rotation, the traveller is caused to rub against the ring, and while the ring and the traveller may, of course, be highly polished, nevertheless, if the ring is not properly lubricated, there will be rapid wear in both the ring and traveller.

A difficulty which is frequently experienced in the use of improperly lubricated rings using travellers made from non-ferrous metal is known as "brassing". Rings are said to be "brassed" when the brass or other metal, of which the traveller is made, has been deposited on the bearing surface of the ring. Minute particles of the traveller are rubbed off and become deposited on the ring surface resulting in increased friction, and reduced speed.

Many attempts have been made to provide rings which may be adequately lubricated either by hand or automatically.

For automatic lubrication with oil, the use of a wick inserted through a hole bored in the wall of the ring, the wick being connected with a reserve supply of oil, has been proposed. A further improvement in oil lubricated rings and one which has been very successful, consists in the provision of a spring wick clipped into a groove which extends horizontally or helically entirely around the inside of the ring. The wick is connected to a source of oil supply to avoid the necessity for frequent applications of oil.

While the above mentioned oil lubricated rings are adequate for many purposes, they are subject to certain limitations which are inherent in the use of oil as a lubricating medium. For example, oil lubricated rings of these as well as other types have not been successful in the wettest forms of spinning and twisting. One reason for this appears to be that very little oil gets to the top of the ring and any that does get there is quickly washed away by the water.

It has long been recognized that grease is at least as good a lubricant as oil for certain specified types of ring and traveller lubrication and that it is considerably better than oil for lubricating rings which are used in the presence of water. The grease, unlike the oil, is not washed away by the water and, particularly where the rings are greased by hand, a residue of grease is left on the top part of the ring and this further protects the ring from the corrosive action of the water and also prevents the accumulation of sticky gum.

Moreover in the spinning of what may be termed hairy yarns such as worsted, wool or jute, oil lubricated rings have the further limitation that when the bobbins are nearly full the loose hairs of the yarn wipe off and absorb the oil from the interior surface of the ring, thus preventing the proper lubrication of the traveller.

The grease being more viscous than oil, will stay on the ring longer and it may be noted that a grease can be obtained which is not only an excellent lubricant, but is also practically stainless.

Grease lubricated rings have hitherto been made with internal grooves or grooves which extend helically entirely around the inside of the ring. Where the groove is in one plane, then only that part of the traveller opposite the groove is in contact with the grease. This also applies to the helical groove with the exception that the area of the traveller which is lubricated is increased by the pitch of the helix.

Such arrangements moreover, are dependent upon a temperature rise to cause the grease to flow over the bearing surface and the circumferential grooves substantially reduce the bearing suface of the ring, with the result that the pressure exerted by the traveller is increased per unit of bearing surface, or per square inch, and in consequence the risk of "brassing" the ring is increased.

The object of the present invention is to provide a grease lubricated ring which will have a large grease holding capacity spread over the entire traveller bearing surface without materially reducing the latter.

According to the present invention, the ring is provided on its inner surface with two or more grooves which are disposed at an angle with respect to the plane in which the ring lies and in which the traveller moves. Each of these grooves has two definite ends, one being at a higher level than the other. The grooves are formed on that part of the inner surface of the ring with which the traveller contacts, os is apt to contact, during its rapid travel around the ring.

Furthermore, the diameter of the top or the top and bottom of the ring may be enlarged or checked out above or above and below the actual bearing surface for the traveller whereby the latter surface is in advance of the enlarged or checked out portions. The upper end of each groove preferably but not necessarily extends into the enlarged or checked out portion at the top and the bottom end of each groove extends into the enlarged or checked out portion at the bottom when such is provided.

The invention will be described with reference to the accompanying drawing in which.

Figure 1:
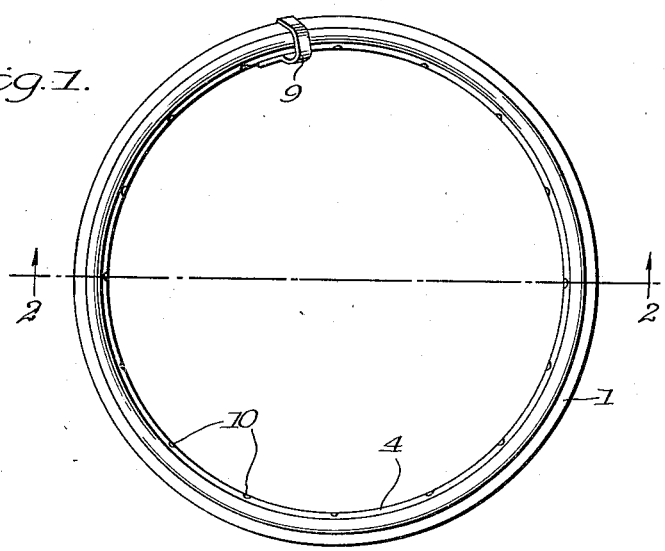
Fig. 1 is a plan view of a vertical twisting or doubling ring with enlarged portions at top and bottom.
Figure 2:
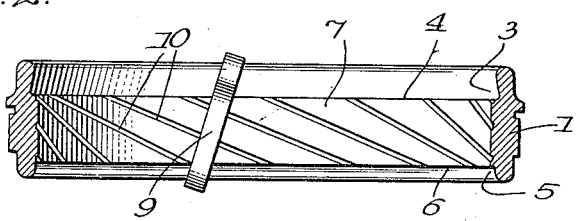
Fig. 2 is a transverse section on line 2—2 of Fig. 1.
Figure 3:
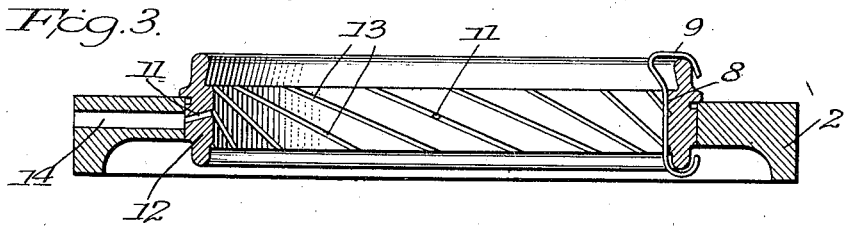
Fig. 3 is a transverse sectional view of a modified form of the invention showing the ring disposed within a ring plate.

The ring 1 shown in Figs. 1 and 2 is mounted in the usual manner, when in use, in a conventional ring plate which may be similar to the ring plate 2, as shown in Fig. 3.

The ring 1 is preferably formed with a checked out or cut away portion 3 at the top, thus forming a shoulder 4, and this checked out portion may take the form of a groove as shown in Fig. 2. The lower portion of the ring is also checked out or cut away as at 5, providing a shoulder 6. It will be noted that the checked out portion 3 is considerably deeper than the checked out portion 5 and the reason for this will become apparent from the following description.

The part 7 of the inner surface between the checked out portions 3 and 5 forms the bearing surface on which the body or bearing part 8 of the traveller 9 normally bears and runs.

This portion of the inner surface of the ring which is intermediate the upper and lower edges of the ring is usually referred to as the bearing surface of the ring, although it will be understood that in the use of various sizes and types of travellers and rings, the surface which is actually contacted by the traveller will vary in its position relative to the edges of the ring, and, of course, the width of the portion which is actually contacted will also vary, depending on these and other factors.

The lubrication of this portion of the ring, as well as other portions of the ring, is made possible by the provision therein of two or more grease-retaining grooves 10, each of which is angularly disposed with respect to the plane in which the ring lies and in which the traveller moves, and these grooves 10 are preferably continued into the checked out portions 3 and 5 as shown in Fig. 2, although if desired they may terminate below and above the checked out portions. The grooves are arranged in a series about the inner surface of the ring preferably in such a manner that the upper end of each groove is located above the next groove, and preferably, the grooves are parallel to each other.

The angle of inclination of the grooves with respect to the ring and the number of grooves will be determined by the conditions under which the ring is intended to be used, but the inclination and the number of the grooves is preferably so adjusted that a traveller will, when in operation, span at least two of the grooves.

It will be understood that, by reason of the fact that the traveller is inclined in the direction of its travel during its rotation about the ring, the grooves may be vertically disposed but obliquely disposed grooves as shown in the drawing are preferred.

Where obliquely disposed grooves are used, their inclination is preferably downward in the direction of travel of the traveller about the ring, as shown in the drawing, but it has been found that excellent results are obtained when the traveller is rotated in the opposite direction. In other words, the grooves may be inclined upwardly in the direction of traveller movement instead of downwardly as shown in the drawing.

In operation, the grooves 10 are filled with a suitable grease, preferably by hand, and a reserve supply is placed in the checked out portion 3 at the top of the ring. Since the traveller 9, as it rotates around the ring 1 passes obliquely across the grease-retaining grooves 10, and since the latter preferably traverse the whole of the bearing surface 7 of the ring on which the body or bearing part 8 of the traveller 9 runs, it results that the traveller must be lubricated over its whole body or bearing surface.

The amount of grease held by the ring and consequently the amount of lubrication available for the traveller is determined by the number, angle, and size of the grooves cut in the ring.

Moreover, the grease will also be brought into contact with and lubricate the foot of the traveller 9, since it will tend to flow down the grooves 10 into the checked out portion 5 at the bottom of the ring and around the lower edge of the ring, and at the same time, the supply of grease in the grooves 10 will be maintained from the reserve supply in the checked out portion 3.

It will be evident from the foregoing description that the traveller 9 in its rotation around the ring 1 will be in intimate contact with the grease over practically its whole bearing surface, and moreover the area of contact of the traveller with the bearing surface of the ring is not materially reduced by the grooves.

Instead of the grease being applied to the grooves by hand, it may be applied by a conventional grease gun or similar lubricating device, and the modification shown in Fig. 3 is particularly adapted for such lubrication. Referring to Fig. 3, it will be noted that one or more transverse openings 11 may be formed in the wall of the ring 12 and each opening, which may be round, elongated, or of any other desired form, preferably communicates directly with one of the grease-retaining grooves 13 although it may communicate with the checked out portion 3 or other parts of the ring. One or more corresponding but larger conduits 14 are formed in the ring plate 2, the ring being fixed in the plate with the openings in the ring communicating with the conduits in the ring plate.

When a grease gun is employed for supplying the grease, a nipple is preferably fixed at the outer end of the conduit 14 in the ring plate 2.

If the grease is to be supplied by a grease cup lubricator, the stem of the latter may be fixed directly into the conduit 14 or alternatively the lubricator may be connected to the conduit 14 by a tube. Such tube may be straight or partly straight and partly bent to any desired angle or assembled to any suitable form by employing separate parts of suitable shape.

The grease cup lubricator may be of the spring pressure, screw down or other suitable type.

Figure 4:
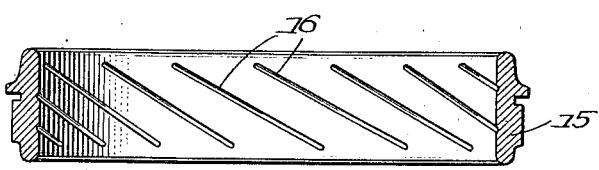
Fig. 4 is a sectional view of another modified form of the invention.

Although the invention has been described with reference to a ring having enlarged or checked out portions at the top or bottom, it is equally applicable to a ring with a plain inner surface, and its application to such a ring is shown in Fig. 4.

As shown in Fig. 4, the ring 15 is provided with a series of grooves 16 which are angularly, or preferably obliquely, disposed as described with reference to Figs. 1 to 3, and each of the grooves has a definite ending a short distance from the top and bottom of the ring. As in the case of the preferred embodiment, described above, the area which is traversed by the grooves 16 is the bearing surface which the body of the traveller normally contacts in its rotation about the ring, and as heretofore explained, the angularity of the grooves and their spacing with respect to the upper and lower edges of the ring may be varied, depending on the location of the bearing seurface which, in turn, is dependent upon various factors, including the size and style of the traveller.

Figure 5:
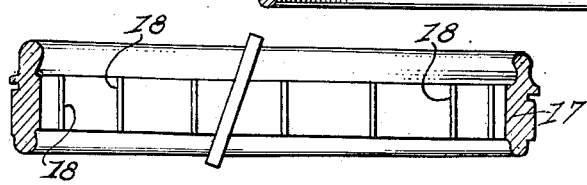
Fig. 5 is a sectional view of still another modified form of the invention.

A further modification is shown in Figure 5 wherein the ring 17 is provided with vertical grooves 18, which extend into the cut-away portions at the top and bottom of the ring. In other words, the grooves in this modification are disposed at right angles to a plane normal to the axis of the ring.

Although the invention has been described in detail it will be understood that it is not limited to all features set forth in the drawing and in the foregoing description, and that modifications of the several forms described may be made without departing from the invention.

What I claim as my invention and desire to protect by Letters Patent is:

1. A ring of the type used in spinning, doubling or twisting and adapted to support a traveller, and having a plurality of separate lubricant retaining grooves on its inner surface, the grooves extending across that portion of the inner surface of the ring with which the body of the traveller contacts when rotated about the ring, each of the grooves having two definite ends, one end being at a higher level than the other.

2. A ring of the type used in spinning, doubling or twisting and adapted to support a traveller, and having a plurality of separate lubricant retaining grooves on its inner surface the grooves extending across that portion of the inner surface of the ring with which the body of the traveller contacts when rotated about the ring, each of the grooves having two definite ends, one end being at a higher level than the other and the grooves being parallel to each other.

3. A ring of the type used in spinning, doubling and twisting and adapted to support a traveller having a plurality of separate lubricant retaining grooves on its inner surface, the grooves extending across that portion of the inner surface of the ring with which the body of the traveller contacts when rotated about the ring, each of the grooves having two definite ends, one end being at a higher level than the other, and having a portion of its inner surface cut away to form a substantially horizontal shoulder to receive a reserve of lubricant above the upper ends of the grooves and into which the said grooves enter and receive lubricant therefrom.

4. A ring of the type used in spinning, doubling and twisting and adapted to support a traveller having a plurality of separate lubricant retaining grooves on its inner surface, the grooves extending across that portion of the inner surface of the ring with which the body of the traveller contacts when rotated about the ring, each of the grooves having two definite ends, one end being at a higher level than the other, and having a portion of its inner surface cut away at the top and bottom to form two substantially horizontal shoulders above the upper and lower ends of the grooves and into which the said grooves enter.

THOMAS K. POWRIE.